United States Patent
Kodimer et al.

(10) Patent No.: US 8,270,008 B2
(45) Date of Patent: Sep. 18, 2012

(54) SYSTEM AND METHOD FOR ON-DEMAND GENERATION OF A SELECTABLE INPUT FOR ENACTING A PREVIOUS DOCUMENT PROCESSING DEVICE CONTROL SEQUENCE

(75) Inventors: Marianne L. Kodimer, Huntington Beach, CA (US); Harpreet Singh, Orange, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1254 days.

(21) Appl. No.: 12/030,239

(22) Filed: Feb. 13, 2008

(65) Prior Publication Data
US 2009/0204644 A1  Aug. 13, 2009

(51) Int. Cl.
*G06F 15/00* (2006.01)
*G06F 3/12* (2006.01)
*G06F 3/048* (2006.01)
*G06F 19/00* (2011.01)
*G06K 15/00* (2006.01)
*G03G 15/00* (2006.01)

(52) U.S. Cl. ........ 358/1.15; 358/1.16; 358/1.9; 358/2.1; 399/403; 715/826; 700/108

(58) Field of Classification Search .................. 700/108; 358/1.15, 1.16, 3.27, 520, 448; 715/826; 399/403
See application file for complete search history.

(56) References Cited

U.S. PATENT DOCUMENTS

| | | | | |
|---|---|---|---|---|
| 5,671,420 A * | 9/1997 | Bell et al. | ...................... | 717/167 |
| 5,896,292 A * | 4/1999 | Hosaka et al. | ................ | 700/108 |
| 6,433,884 B1 * | 8/2002 | Kawakami | ................... | 358/1.15 |
| 6,919,967 B1 * | 7/2005 | Pentecost et al. | ............ | 358/1.15 |
| 6,968,150 B2 * | 11/2005 | Ferlitsch | ...................... | 399/403 |
| 7,158,244 B2 * | 1/2007 | Sommer et al. | .............. | 358/1.13 |
| 2001/0035972 A1 * | 11/2001 | Wurmfeld | .................... | 358/1.13 |
| 2004/0080546 A1 * | 4/2004 | Fritz | ............................ | 345/826 |
| 2005/0068580 A1 * | 3/2005 | Kuo et al. | .................... | 358/1.16 |
| 2005/0264833 A1 * | 12/2005 | Hiraoka et al. | ................ | 358/1.9 |
| 2007/0268519 A1 * | 11/2007 | Appercel et al. | ............. | 358/1.15 |

* cited by examiner

*Primary Examiner* — Akwasi M Sarpong
(74) *Attorney, Agent, or Firm* — SoCal IP Law Group LLP; Steven C. Sereboff; Jonathan Pearce

(57) ABSTRACT

The subject application is directed to a system and method for on-demand generation of a selectable input for enacting a previous document processing device control sequence. User identification data is received, and a document processing session is opened. A sequence of instructions is then received, and data associated with the sequence is logged according to identification data. After the session opening, logged data is stored in associated memory. Data of a request to generate a selectable input corresponding to the logged data is then received, and testing is performed to determine whether data has been logged in a current session. Data logged during the session is associated with the selectable input, and stored data is retrieved and associated with the selectable input when no data has been logged during the current session. The sequence of selected instructions is then commenced upon the selection of the selectable input by the user.

12 Claims, 11 Drawing Sheets

SYSTEM AND METHOD FOR ON-DEMAND GENERATION OF A SELECTABLE INPUT FOR ENACTING A PREVIOUS DOCUMENT PROCESSING DEVICE CONTROL SEQUENCE

BACKGROUND OF THE INVENTION

The subject application is directed generally to customizable controls for devices and is particularly applicable to on-demand generation of controls for a series of tasks to be performed by document processing devices.

Document processing devices in common use today include copiers, scanners, facsimile machines, and printers. It is increasingly common to have one device perform two or more document processing functions. These devices, referred to as multifunction peripherals or MFPs, are commonly found in both commercial and private use.

As document processing devices become more powerful, more functions and options are made available to users. Devices such as printers include options for selection of media such as various paper sizes or types, as well as finishing options such as collation, hole-punching, stapling, binding, and the like. In devices such as MFPs, a user may select to have one or more documents copied, scanned, archived, and transmitted by electronic mail in a single sequence of operations.

Many users will frequently engage in one or more operations that are used repetitively. For example, an accounting department may receive paper invoices. A set procedure may require every received invoice to be copied, scanned to an optical character recognition format, and transmitted by facsimile to headquarters.

It may be desirable to program repetitive tasks so that complete instructions do not have to be entered each time. Many users, however, are not sufficiently sophisticated to engage in such programming. Further, many tasks are only used for a relatively short period of time, such that more permanent programming of repetitive steps is not warranted.

SUMMARY OF THE INVENTION

In accordance with one embodiment of the subject application, there is provided a system and method for customizable controls for devices.

Further, in accordance with one embodiment of the subject application, there is provided a system and method for on-demand generation of controls for a series of tasks to be performed by document processing devices.

Still further, in accordance with one embodiment of the subject application, there is provided a system for on-demand generation of a selectable input for enacting a previous document processing device control sequence. The system comprises means adapted for receiving identification data corresponding to a user of an associated document processing device and means adapted for opening a document processing session in accordance with received identification data. The system also comprises means adapted for receiving a sequence of document processing instructions during a session and logging means adapted for logging data associated with a received sequence of selected document processing instructions in accordance with received identification data. The system further includes memory means adapted for storing logged data from the logging means after opening a document processing session, means adapted for receiving request data corresponding to a request to generate a selectable input corresponding to logged data, and testing means adapted for testing whether data has been logged in a current session. The system also includes association means adapted for associating data logged in the current session to the selectable input when the testing means indicates that the data has been logged in the current session and means adapted for retrieving stored logged data from the memory means when the testing means indicates that no data has been logged in the current session. In addition, the association means includes means adapted for associating logged data retrieved from the memory means to the selectable input. The system further comprises means adapted for commencing performance of the sequence of selected document processing instructions in accordance with a selection of the selectable input by the user.

In one embodiment of the subject application, the system includes a graphical user interface. The graphical user interface includes means adapted for generating selectable indicia thereon, wherein the request data is generated in accordance with selection thereof, and means adapted for generating a selectable control indicia thereon corresponding to a selectable input, whereby the sequence of selected document processing instructions is commenced upon selection thereof.

In another embodiment of the subject application, the system further comprises means adapted for overwriting logged data in the memory means stored in conjunction with a document processing session with logged data from a current document processing session.

In yet another embodiment of the subject application, the system also includes means adapted for generating indicia corresponding to the sequence of document processing instructions.

In a further embodiment of the subject application, the system also includes means adapted for receiving approval data corresponding to approval of the sequence of document processing instructions received after generating of the indicia corresponding to the sequence of document processing instructions. Preferably, the association means includes means adapted for associating logged data with the selectable input in accordance with received approval data.

Still further, in accordance with one embodiment of the subject application, there is provided a method for on-demand generation of a selectable input for enacting a previous document processing device control sequence in accordance with the system as set forth above.

Still other advantages, aspects, and features of the subject application will become readily apparent to those skilled in the art from the following description, wherein there is shown and described a preferred embodiment of the subject application, simply by way of illustration of one of the modes best suited to carry out the subject application. As it will be realized, the subject application is capable of other different embodiments, and its several details are capable of modifications in various obvious aspects, all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for customizable controls for devices. In particular, the subject application is directed to a system and method for on-demand generation of controls for a series of tasks to be performed by document processing devices. More particularly, the subject application is directed to a system and method for on-demand generation of a selectable input for enacting a previous document processing device control sequence. It will become apparent to those skilled in the art that the system and method described herein are suitably adapted to a plurality of varying electronic fields employing user-customizable device controls including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
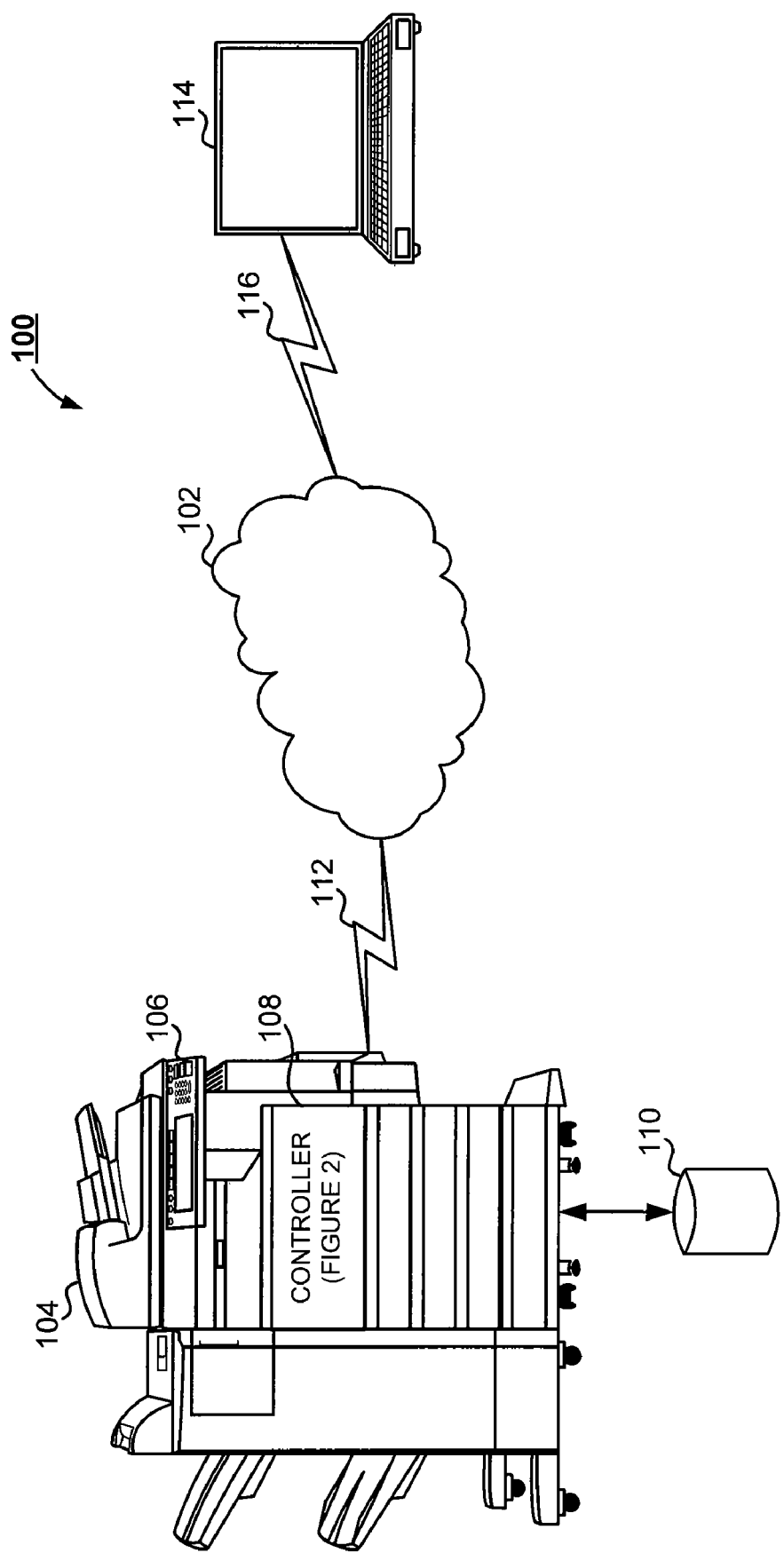
FIG. 1 is an overall diagram of a system for on-demand generation of a selectable input for enacting a previous document processing device control sequence according to one embodiment of the subject application.

Referring now to FIG. 1, there is shown an overall diagram of a system 100 for on-demand generation of a selectable input for enacting a previous document processing device control sequence in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, and any suitable combination thereof. In accordance with the preferred embodiment of the subject application, the computer network 102 is comprised of physical layers and transport layers, as illustrated by the myriad conventional data transport mechanisms such as, for example and without limitation, Token-Ring, 802.11(x), Ethernet, or other wireless or wire-based data communication mechanisms. The skilled artisan will appreciate that, while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, and the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components suitably adapted to present data to the associated user, as are known in the art. In accordance with one embodiment of the subject application, the user interface 106 comprises a display suitably adapted to display one or more graphical elements, text data, images, or the like to an associated user, receive input from the associated user, and communicate the same to a backend component such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any of the myriad components associated with the document processing device 104, including hardware, software, or combinations thereof, which function to perform, cause to be performed, control, or otherwise direct the methodologies described hereinafter. It will be understood by those skilled in the art that the methodologies described with respect to the controller 108 are capable of being performed by any general purpose computing system known in the art and, thus, the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for on-demand generation of a selectable input for enacting a previous document processing device control sequence of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, and any suitable combination thereof. In the preferred embodiment, the data storage device 110 is suitably adapted to store document data, image data, electronic database data, or the like. It will be appreciated by those skilled in the art that, while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive or the like.

The system 100 illustrated in FIG. 1 further depicts a user device 114 in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system or wired communications known in the art. Preferably, the user device 114 is suitably adapted to generate and transmit electronic documents, document processing instructions, user interface modifications, upgrades, updates, personalization data, or the like to the document processing device 104 or any other similar device coupled to the computer network 102.

Figure 2:
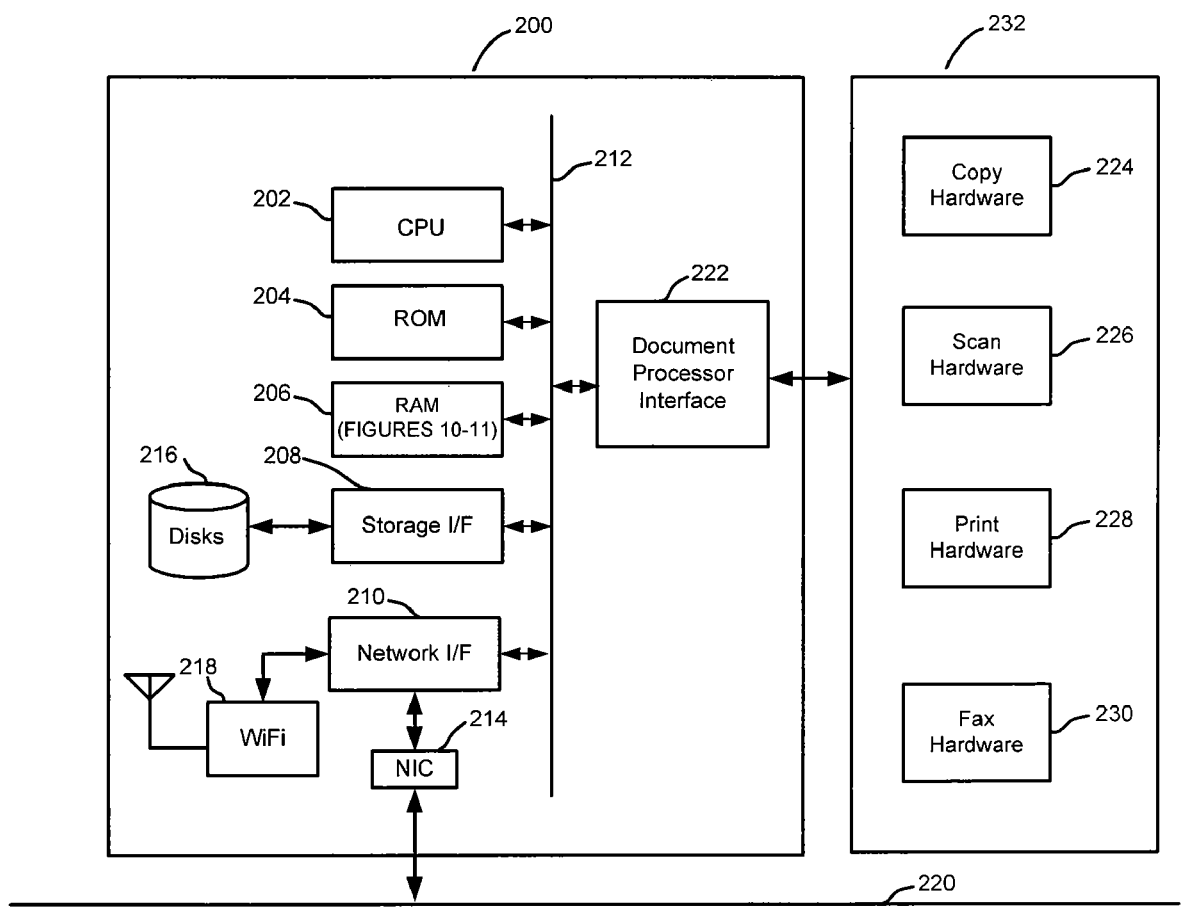
FIG. 2 is a block diagram illustrating controller hardware for use in the system for on-demand generation of a selectable input for enacting a previous document processing device control sequence according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device known in the art that is capable of facilitating the methodologies described herein. Included is a processor 202 suitably comprised of a central processor unit. However, it will be appreciated by one of ordinary skill in the art that processor 202 may advantageously be composed of multiple processors working in concert with one another. Also included is a non-volatile or read only memory 204, which is advantageously used for static or fixed data or instructions such as BIOS functions, system functions, system configuration data, and other routines or data used for operation of the controller 200.

Also included in the controller 200 is random access memory 206 suitably formed of dynamic random access memory, static random access memory, or any other suitable, addressable, and writable memory system. Random access memory 206 provides a storage area for data instructions associated with applications and data handling accomplished by processor 202.

A storage interface 208 suitably provides a mechanism for non-volatile, bulk, or long term storage of data associated with the controller 200. The storage interface 208 suitably uses bulk storage such as any suitable addressable or serial storage, such as a disk, optical, tape drive and the like as shown as 216, as well as any suitable storage medium, as will be appreciated by one of ordinary skill in the art.

A network interface subsystem 210 suitably routes input and output from an associated network, allowing the controller 200 to communicate to other devices. The network interface subsystem 210 suitably interfaces with one or more connections with external devices to the controller 200. By way of example, illustrated is at least one network interface card 214 for data communication with fixed or wired networks such as Ethernet, token ring, and the like and a wireless interface 218 suitably adapted for wireless communication via means such as WiFi, WiMax, wireless modem, cellular network, or any suitable wireless communication system. It is to be appreciated, however, that the network interface subsystem 210 suitably utilizes any physical or non-physical data transfer layer or protocol layer. In the illustration, the network interface 214 is interconnected for data interchange via a physical network 220 suitably comprised of a local area network, wide area network, or a combination thereof.

Data communication between the processor 202, read only memory 204, random access memory 206, storage interface 208, and the network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
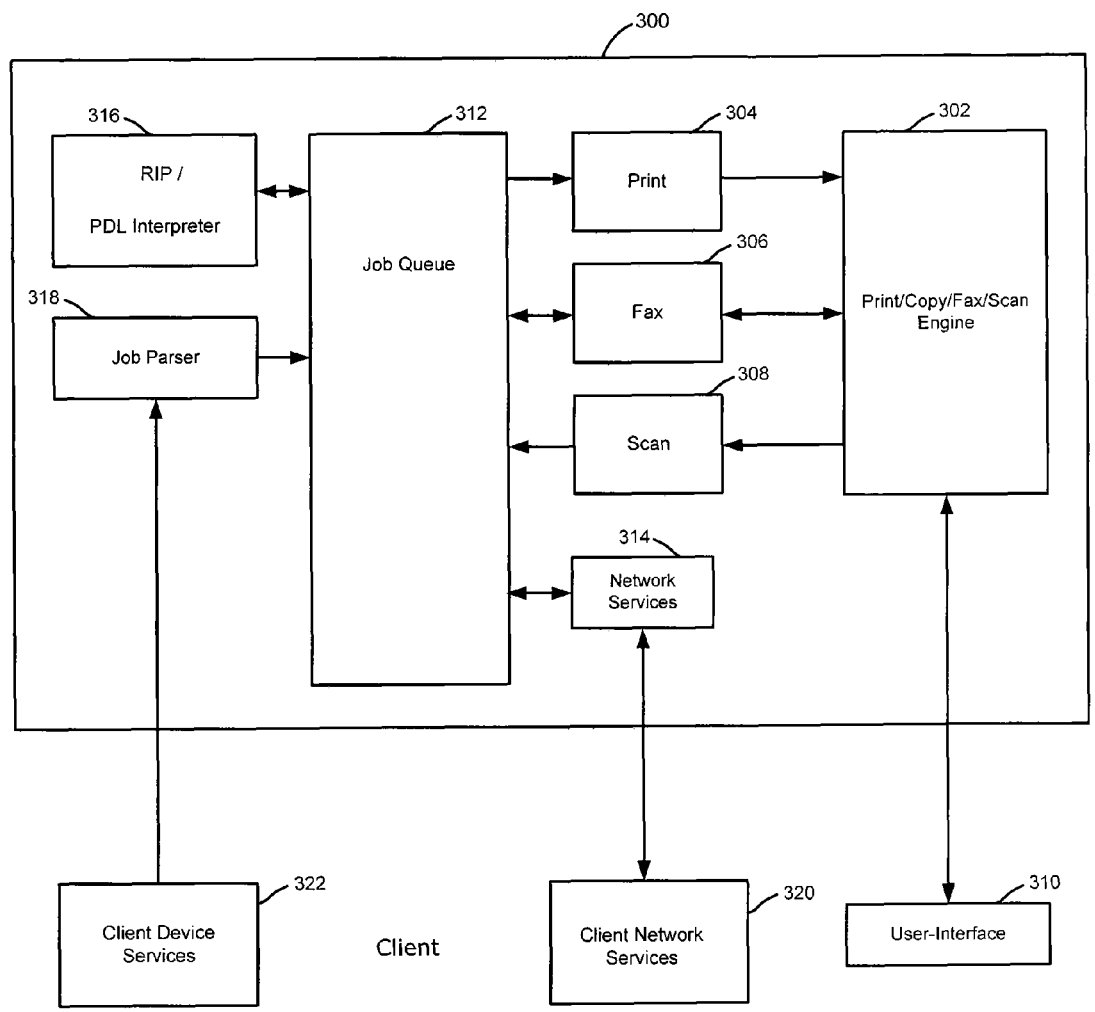
FIG. 3 is a functional diagram illustrating the controller for use in the system for on-demand generation of a selectable input for enacting a previous document processing device control sequence according to one embodiment of the subject application.

Functionality of the subject system 100 is accomplished on a suitable document processing device, such as the document processing device 104, which includes the controller 200 of FIG. 2 (shown in FIG. 1 as the controller 108) as an intelligent subsystem associated with a document processing device. In the illustration of FIG. 3, controller function 300 in the preferred embodiment includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality, as will be appreciated by one of ordinary skill in the art.

In the preferred embodiment, the engine 302 allows for printing operations, copy operations, facsimile operations, and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited-purpose document processing devices capable of performing one or more of the document processing operations listed above.

The engine 302 is suitably interfaced to a user interface panel 310, which panel 310 allows for a user or administrator to access functionality controlled by the engine 302. Access is suitably enabled via an interface local to the controller or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms such as bit map, page description language or vector format, and the like are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter, or any suitable mechanism for interchange of an electronic document to a format better suited for interchange with device functions such as print 304, facsimile 306, or scan 308.

Finally, the job queue 312 is in data communication with a parser 318, which parser 318 suitably functions to receive print job language files from an external device such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

In operation, identification data is received corresponding to a user of an associated document processing device. A document processing session is then opened in accordance with the received identification data. During a document processing session, a sequence of document processing instructions is received, and data associated with the received sequence of selected document processing instructions is logged in accordance with the received identification data. The logged data is then stored in associated memory after the opening of a document processing session. Request data is then received corresponding to a request to generate a selectable input corresponding to logged data. Testing is then performed so as to determine whether data has been logged in a current session. Data logged in the current session is then associated with the selectable input when the testing indicates that the data has been logged in the current session. Stored logged data is thereafter retrieved from the associated memory when the testing indicates that no data has been logged in the current session. Logged data retrieved from the associated memory is then associated with the selectable input. A performance of the sequence of selected document processing instructions is then commenced in accordance with the selection of the selectable input by the user.

In accordance with one example embodiment of the subject application, user identification data is received from a user via the user interface 106 associated with the document processing device 104, from user interaction with the document processing device 104 via the user device 114, or the like. It will be understood by those skilled in the art that the user identification data corresponds to any suitable identifying data known in the art including, for example and without limitation, a username/password, biometric reading, smart card, magnetic card, and the like. Upon receipt of the identification data, the controller 108 or other suitable component associated with the document processing device 104 facilitates the generation of a graphical user interface corresponding to the identification data associated with the user. That is, a custom graphical user interface, e.g. a homepage, is generated via the user interface 106, the user device 114, or the like.

The controller 108 or other suitable component associated with the document processing device 104 then opens a document processing session in accordance with the received user identification data. Via interactions with the user interface 106, the user device 114, or the like, the controller 108 or other suitable component associated with the document processing device 104 receives a sequence of document processing instructions during the document processing session. It will be appreciated by those skilled in the art that the document processing instructions suitably correspond to a series of actions or operations undertaken by the document processing device 104 in the performance of a document processing request. Data associated with the received sequence of instructions is then logged in accordance with the received identification data. The logged data is then stored in associated memory following the opening of the document processing session. In accordance with one embodiment of the subject application, the memory corresponds to, for example and without limitation, the data storage device 110, system memory associated with the document processing device 104, the user device 114, or the like. Logged data in the associated memory is then overwritten in conjunction with the logged data from the current session.

A selectable indicia is then generated on the graphical user interface via the user interface 106, the user device 114, or other suitable component associated with the document processing device 104. According to one embodiment of the subject application, a suitable icon, image, or other selectable indicia is displayed on the graphical user interface of the user interface 106 corresponding to the generation of a template or customized workflow. It will be understood by those skilled in the art that the selectable indicia is further capable of corresponding to a hardware interface of the user interface 106, e.g. a button, toggle-switch, or the like. The controller 108 or other suitable component associated with the document processing device 104 then determines whether a request to generate a selectable input has been received from the associated user; that is, whether the user has selected the selectable indicia on the user interface 106. When the user does not desire to have a selectable input generated in association with the received sequence of document processing instructions, the document processing device 104 performs the sequence of instructions and returns to displaying the graphical user interface on the user interface 106 corresponding to the user identification.

When a request has been received from the user corresponding to the selection of the selectable indicia, a test is performed so as to determine whether data has been logged during the current document processing session. In the event that no data has been logged during the current session, e.g. no sequence of document processing instructions have been received, stored logged data is retrieved from associated memory corresponding to previous document processing sessions. Preferably, the retrieved sequences of document processing instructions of past document processing sessions correspond to the user associated with the current document processing session. In accordance with one embodiment of the subject application, a predetermined past number of sequences are retrieved from the associated memory irrespective of the identity of the user whom input the sequence. The previously stored sequences are then displayed to the user associated with the current session, who is then prompted to select at least one of the sequences to be associated with a selectable input. An indicia is then generated on the graphical user interface associated with the user interface 106, the user device 114, or the like corresponding to the selected sequence.

When data has been logged during the current session, the logged data is associated with a selectable input, e.g. a selectable icon displayed on the graphical user interface associated with the user interface 106, the user device 114, or the like. Logged data in memory is then overwritten in conjunction with the sequence of document processing instructions corresponding to the current document processing session. Indicia is then generated on the graphical user interface corresponding to the sequence of the document processing instructions. Preferably, an icon or image is generated on the user interface 106 representative of the selected sequence of document processing instructions associated with the current document processing session.

Approval data is then received from the associated user corresponding to the approval of the generated indicia associated with the sequence as illustrated on the user interface 106. Logged data is then associated by the controller 108 or other suitable component associated with the document processing device 104 in accordance with the received approval data. A selectable control indicia is then generated on the graphical user interface of the user interface 106, user device 114, or the like corresponding to the selectable input associated with the selected sequence. Upon selection of the selectable input by the user, the document processing device 104 commences the performance of the sequence of instructions associated with the selectable input. Thus, as will be appreciated by those skilled in the art, the selectable input corresponds to an icon displayed to the user via a graphical user interface, the selection of which prompts the document processing device 104 to perform a sequence of document processing instructions associated therewith.

Figure 4:
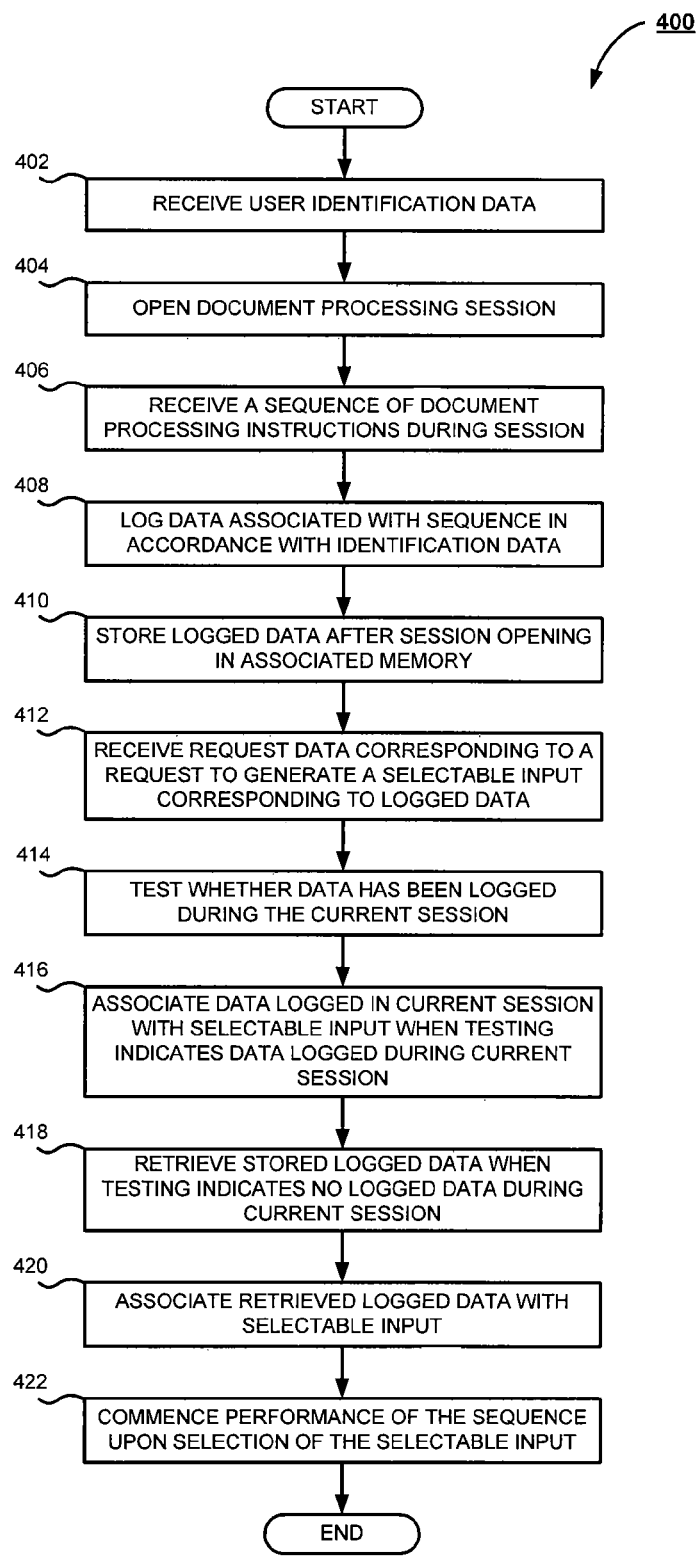
FIG. 4 is a flowchart illustrating a method for on-demand generation of a selectable input for enacting a previous document processing device control sequence according to one embodiment of the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5 and the example interfaces of FIGS. 6-11. Turning now to FIG. 4, there is shown a flowchart 400 illustrating a method for on-demand generation of a selectable input for enacting a previous document processing device control sequence in accordance with one embodiment of the subject application. Beginning at step 402, identification data is received from an associated user of the document processing device 104. It will be appreciated by those skilled in the art that such identification includes, for example and without limitation, a username, password, biometric data, smart card identification, and the like. The skilled artisan will appreciate that such login data is capable of being input directly by the user via interactions with the user interface 106 associated with the document processing device 104; via a thin-client interface, device driver, or the like of the user device 114; or the like.

The controller 108 or other suitable component associated with the document processing device 104 then opens a document processing session associated with the received user identification data at step 404. A sequence of document processing instructions is then received from the user during an open document processing session at step 406 via user interactions with the user interface 106, the user device 114, or the like. Data associated with the sequence is then logged at step 408 in accordance with the received user identification data. At step 410, the logged data is stored in associated memory by the controller 108 or other suitable component associated with the document processing device 104 following the opening of the document processing session. Preferably, the data is logged in memory associated with the document processing device 104 such as, for example and without limitation, system memory, the data storage device 110, or the like.

Request data corresponding to a request to generate a selectable input corresponding to logged data is then received from the associated user via the user interface 106, the user device 114, or the like by the controller 108 at step 412. The controller 108 or other suitable component associated with the document processing device 104 then tests the data at step 414 so as to determine whether the data has been logged during a current session or a previous session. Data logged during a current document processing session is then associated with a selectable input by the controller 108 or other suitable component associated with the document processing device 104 at step 416. At step 418, stored logged data is retrieved from associated memory, e.g. the data storage device 110, upon a testing result indicative that no data has been logged during the current document processing session. The retrieved logged data is then associated, at step 420, with a selectable input by the controller 108 or other suitable component associated with the document processing device 104. Performance of the sequence of document processing instructions is then commenced at step 422 upon the selection by the associated user of the selectable input.

Figure 5:
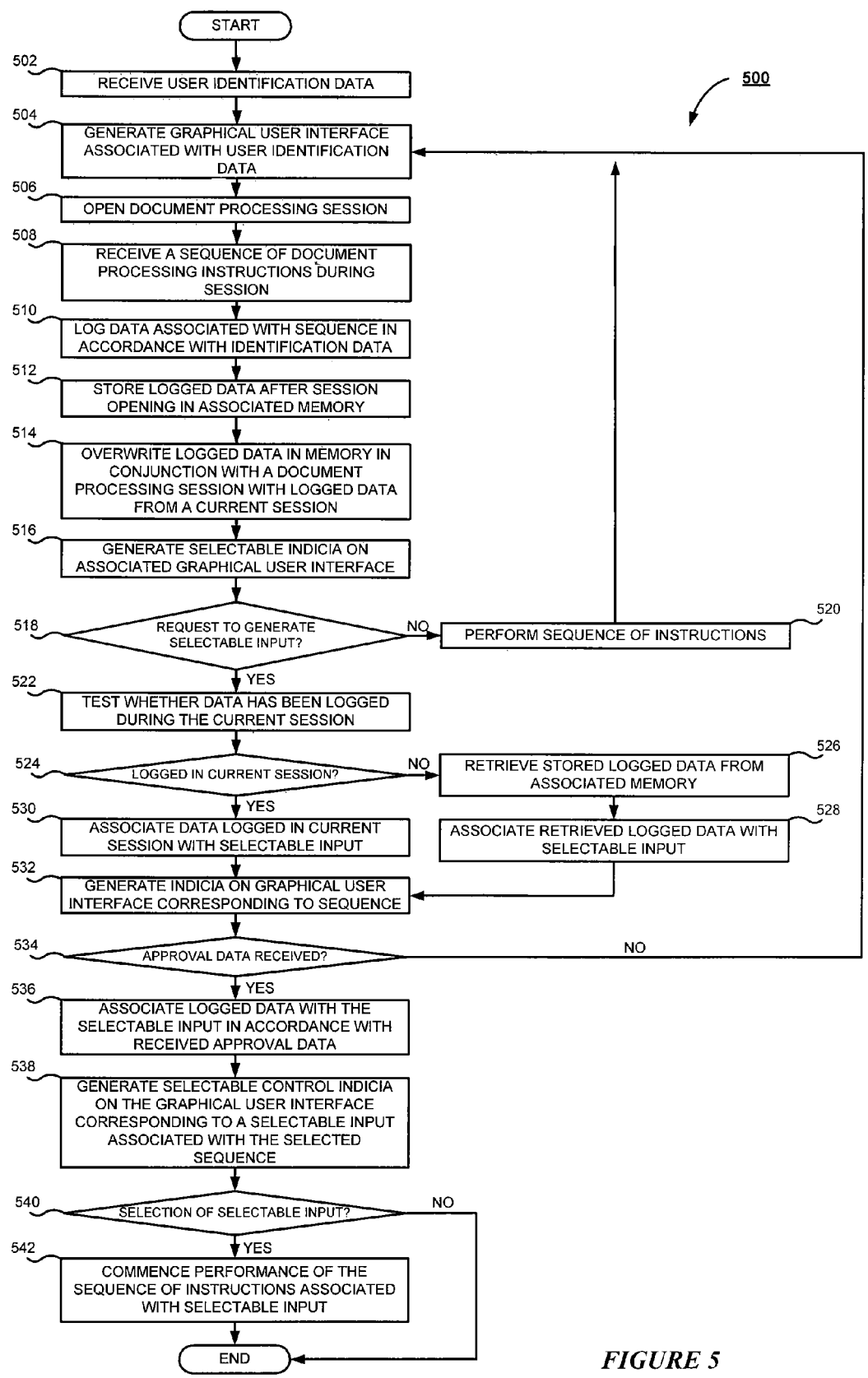
FIG. 5 is a flowchart illustrating a method for on-demand generation of a selectable input for enacting a previous document processing device control sequence according to one embodiment of the subject application.

Referring now to FIG. 5, there is shown a flowchart 500 illustrating a method for on-demand generation of a selectable input for enacting a previous document processing device control sequence in accordance with one embodiment of the subject application. The methodology of FIG. 5 begins at step 502, whereupon user identification data is received from a user via the user interface 106 associated with the document processing device 104. It will be understood by those skilled in the art that user interactions with the document processing device 104 are capable of being undertaken remotely via the user device 114 communicating over the computer network 102, e.g. web-portal, thin-client interface, device driver, etc. The description of FIG. 5 corresponding to direct user interaction at the user interface 106 associated with the document processing device 104 is thus for illustration purposes only. The skilled artisan will further appreciate that suitable identification data received from the associated user includes, for example and without limitation, username/password combinations, smart card data, biometric data, suitable alpha-numeric sequences, magnetic card data, and the like.

Figure 6:
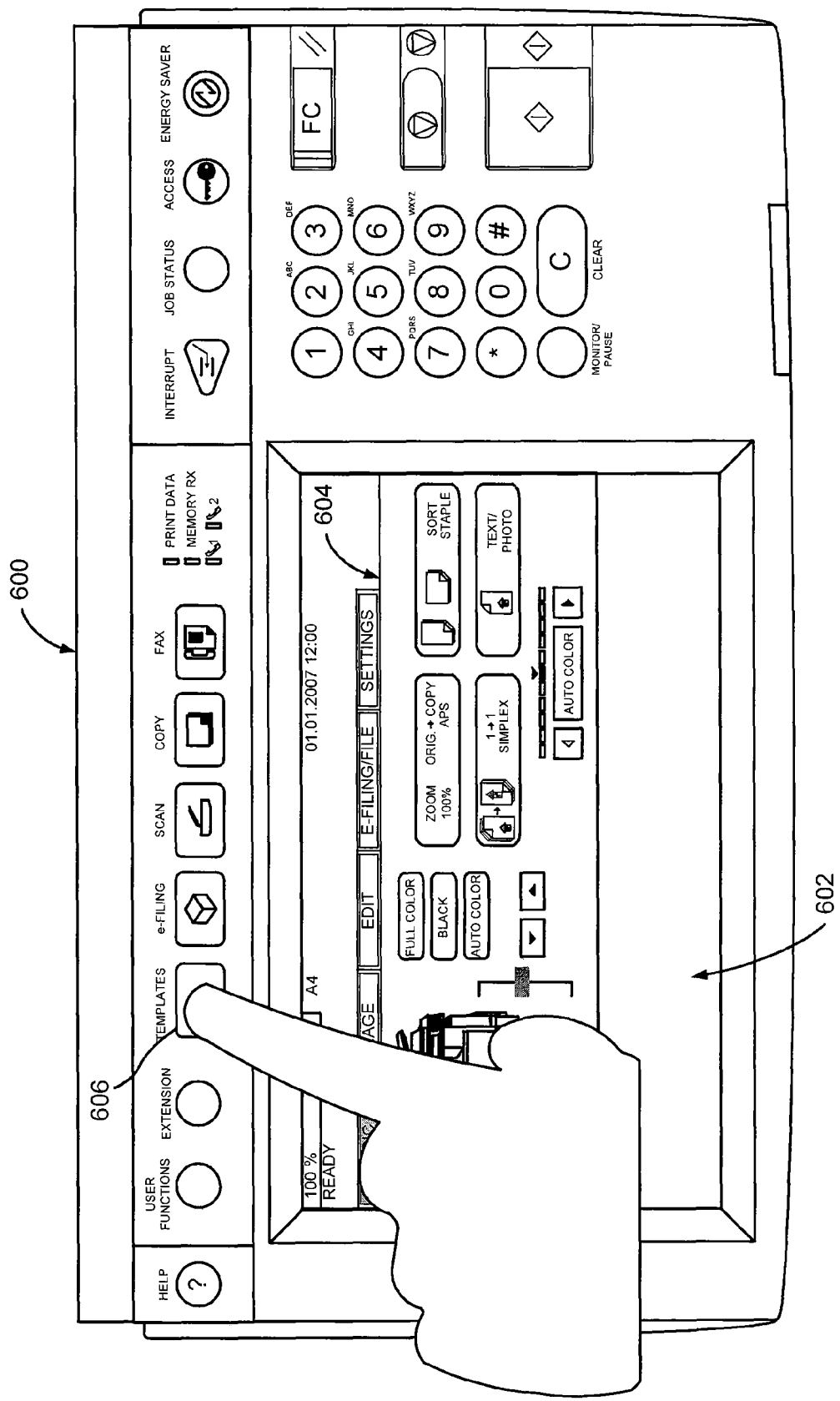
FIG. 6 is an example illustrating a user interface for use in the system for on-demand generation of a selectable input for enacting a previous document processing device control sequence according to one embodiment of the subject application.

A graphical user interface is then generated on the user interface 106 at step 504 in accordance with the received user identification data. Preferably, the graphical user interface incorporates user-selected settings, personalizations, and the like, e.g. a homepage. A suitable example of such a graphical user interface is depicted in the user interface 600 depicted in FIG. 6. As shown in FIG. 6, the user interface 600 includes a touchscreen panel 602, on which is displayed a graphical user interface to facilitate interactions between the associated user and the document processing device 104. Various icons 604 corresponding to settings, functions, operations, and the like associated with the document processing device 104 are displayed on the touchscreen panel 602. The user interface 600 further includes a selectable indicia, shown in FIG. 6 as the template indicia 606, for selection thereof by the associated user. The selection of the template indicia 606 will be discussed in greater detail below.

Following the generation of the graphical user interface, flow proceeds to step 506, whereupon a document processing session is opened corresponding to the received identification data and user interactions with the document processing device 104. It will be appreciated by those skilled in the art that the document processing session is representative of the interactions between the document processing device 104 and the associated user following the logon by the user. At step 508, a sequence of document processing instructions is received during the document processing session in response to interactions with the user interface 106, the user device 114, or the like that the controller 108 or other suitable component associated with the document processing device 104 receives. It will be understood by those skilled in the art that the document processing instructions suitably represent a series of actions or operations to be performed by the document processing device 104 during a document processing request.

Data associated with the received sequence of instructions is then logged by the controller 108 or other suitable component associated with the document processing device 104 at step 510 in accordance with the received identification data. At step 512, the logged data is stored in associated memory following the opening of the document processing session. According to one embodiment of the subject application, the associated memory includes, for example and without limitation, the data storage device 110, system memory associated with the document processing device 104, or the like. Operations then proceed to step 514, whereupon logged data in memory is overwritten in conjunction with the logged data from the current session.

At step 516, selectable indicia is then generated on the graphical user interface via the user interface 106, the user device 114, or other suitable component associated with the document processing device 104. According to one embodiment of the subject application, a suitable icon, image, or other selectable indicia is displayed on the graphical user interface of the user interface 106 corresponding to the generation of a template or customized workflow. It will be understood by those skilled in the art that the selectable indicia is further capable of corresponding to a hardware interface of the user interface 106, e.g. a button, toggle-switch, or the like, such as the selectable indicia 606 illustrated in FIG. 6. A determination is then made at step 518 as to whether a request to generate a selectable input has been received from the associated user; that is, whether or not the user has selected the selectable indicia 606, as shown in FIG. 6. When no such request is received by the controller 108 via the user interface 106, flow proceeds from step 518 to step 520, whereupon the document processing device 104 commences the performance of the sequence of document processing instructions. Thereafter, flow returns to step 504, whereupon the graphical user interface associated with the received user identification data is displayed to the user via the user interface 106.

Figure 7:
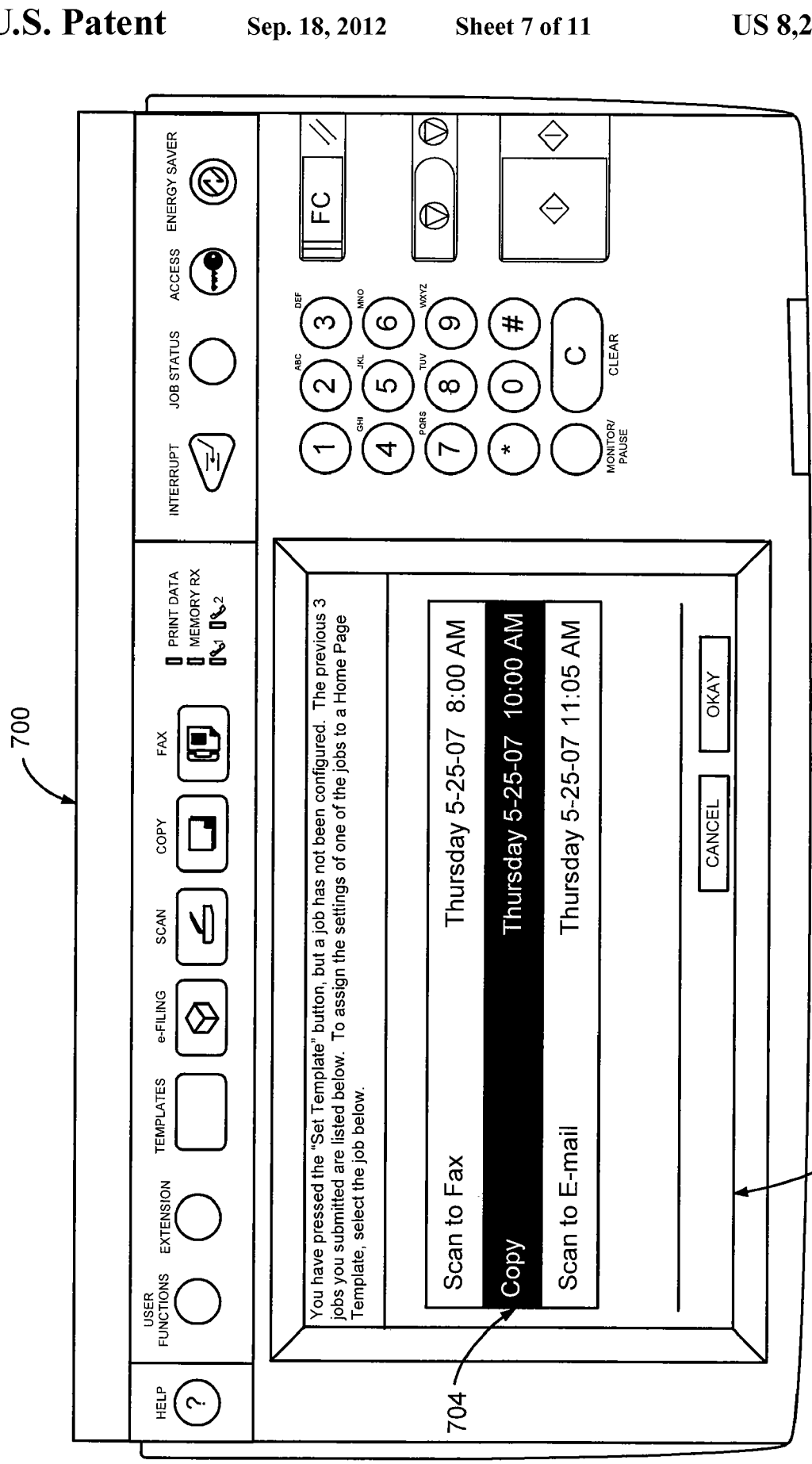
FIG. 7 is a further example illustrating a user interface for use in the system for on-demand generation of a selectable input for enacting a previous document processing device control sequence according to one embodiment of the subject application.

Upon a determination at step 518 that a request has been received from the user corresponding to the selection of the selectable indicia, e.g. the user has selected the selectable indicia 606, flow progresses to step 522. At step 522, a test is performed so as to determine whether data has been logged during the current document processing session. A determination is then made in accordance with the testing of step 522 as to whether data has been logged during the current session at step 524. When it is determined at step 524 that no data has been logged during the current session, e.g. the session opened at step 506, stored logged data is retrieved from the associated memory at step 526. Stated another way, when no sequence of document processing instructions has been received, past sequences of document processing instructions are retrieved from the data storage device 110 and displayed to the user for selection thereof. FIG. 7 illustrates a suitable example user interface 700 displaying past sequences of document processing instructions via the touchscreen panel 702. As shown in FIG. 7, the touchscreen panel 702 depicts three past sequences 704, from which the associated user is capable of selecting a desired sequence for association with a selectable input, e.g. an icon (not shown). Following selection by the user of a desired sequence of instructions, flow proceeds from step 526 to step 528, whereupon the retrieved logged data is associated with a selectable input. Operations then proceed to step 532, whereupon indicia is generated on the graphical user interface of the user interface 106 corresponding to the sequence of document processing instructions selected by the user. A suitable example of such a graphical user interface is shown in FIG. 9, discussed in greater detail below.

Figure 8:
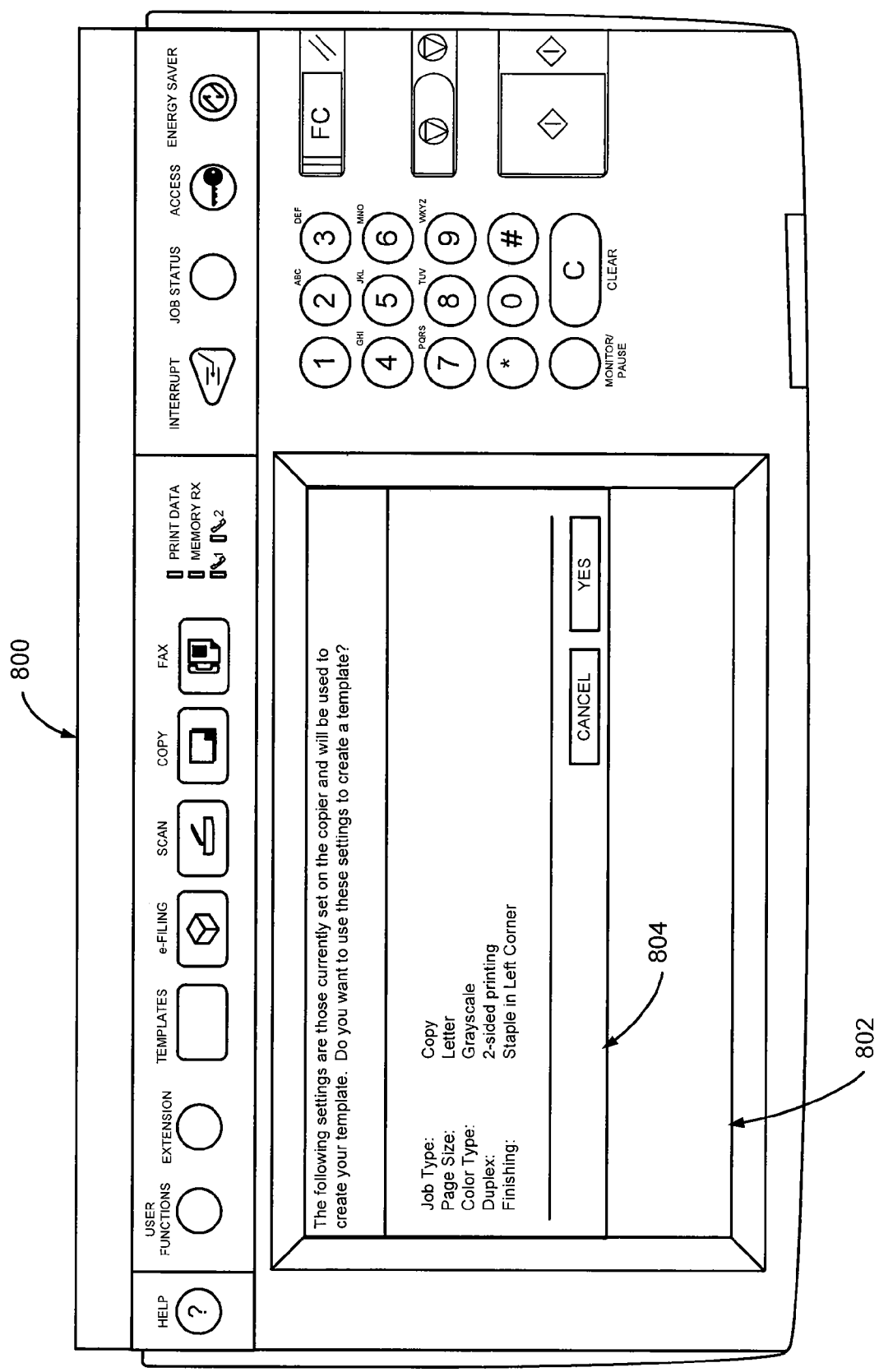
FIG. 8 is another example illustrating a user interface for use in the system for on-demand generation of a selectable input for enacting a previous document processing device control sequence according to one embodiment of the subject application.

Returning to step 524, when a determination is made that data has been logged during the current document processing session, flow proceeds to step 530, whereupon the data logged during the current session is associated with a selectable input. Referring now to FIG. 8, there is shown an example user interface 800 depicting the determination of data logged during a current document processing session. The user interface 800 of FIG. 8 includes a touchscreen panel 802 via which is displayed current logged data 804. The skilled artisan will appreciate that, as shown in FIG. 8, the current logged data 804 is representative of settings and operations selected by the associated user during the current document processing session. At step 532, indicia is generated on the graphical user interface corresponding to the sequence of document processing instructions. In accordance with one embodiment of the subject application, an icon, image, or other graphical representation corresponding to the selected sequence of document processing instructions is generated on the graphical user interface of the user interface 106.

Figure 9:
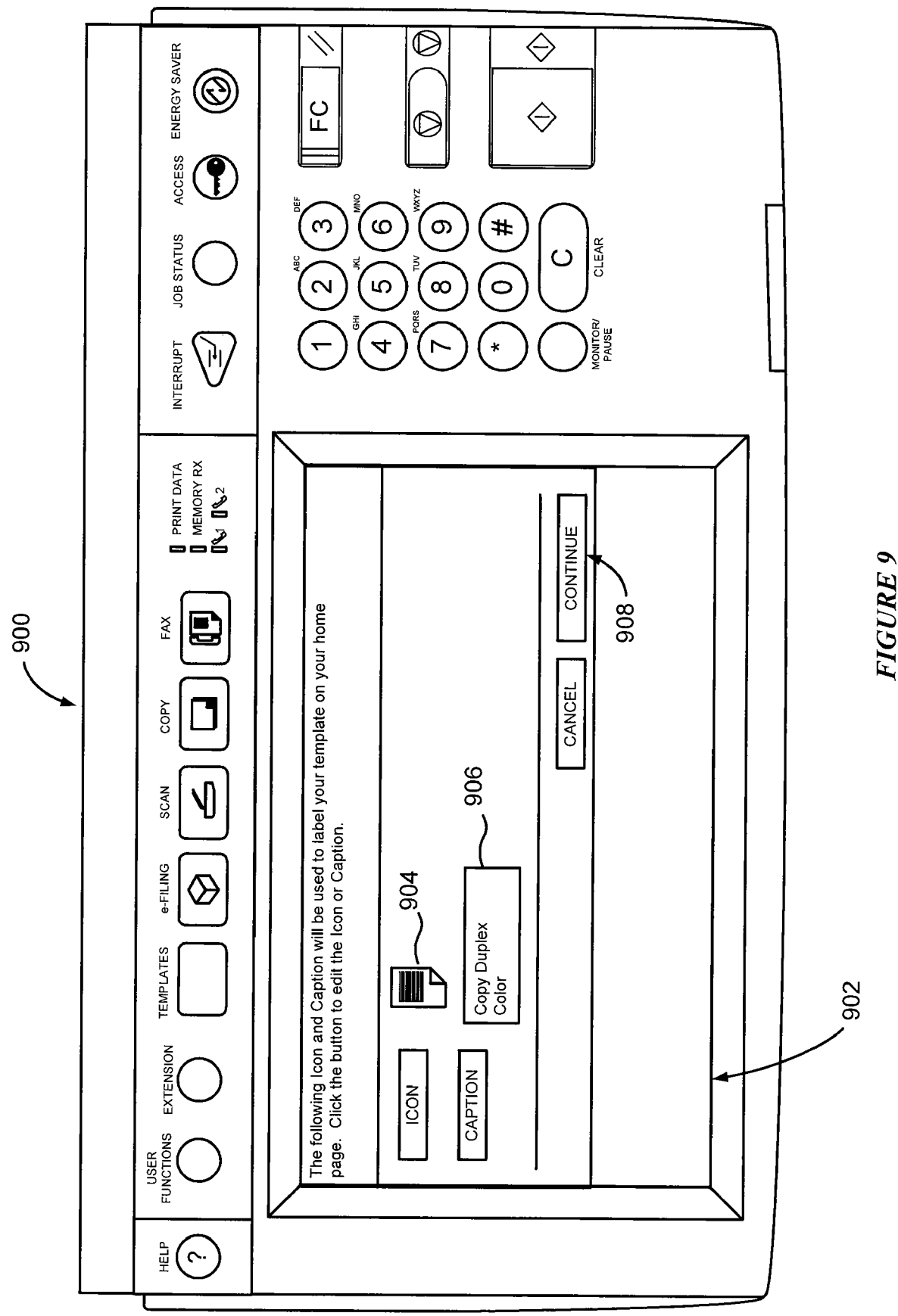
FIG. 9 is an additional example illustrating a user interface for use in the system for on-demand generation of a selectable input for enacting a previous document processing device control sequence according to one embodiment of the subject application.
Figure 10:
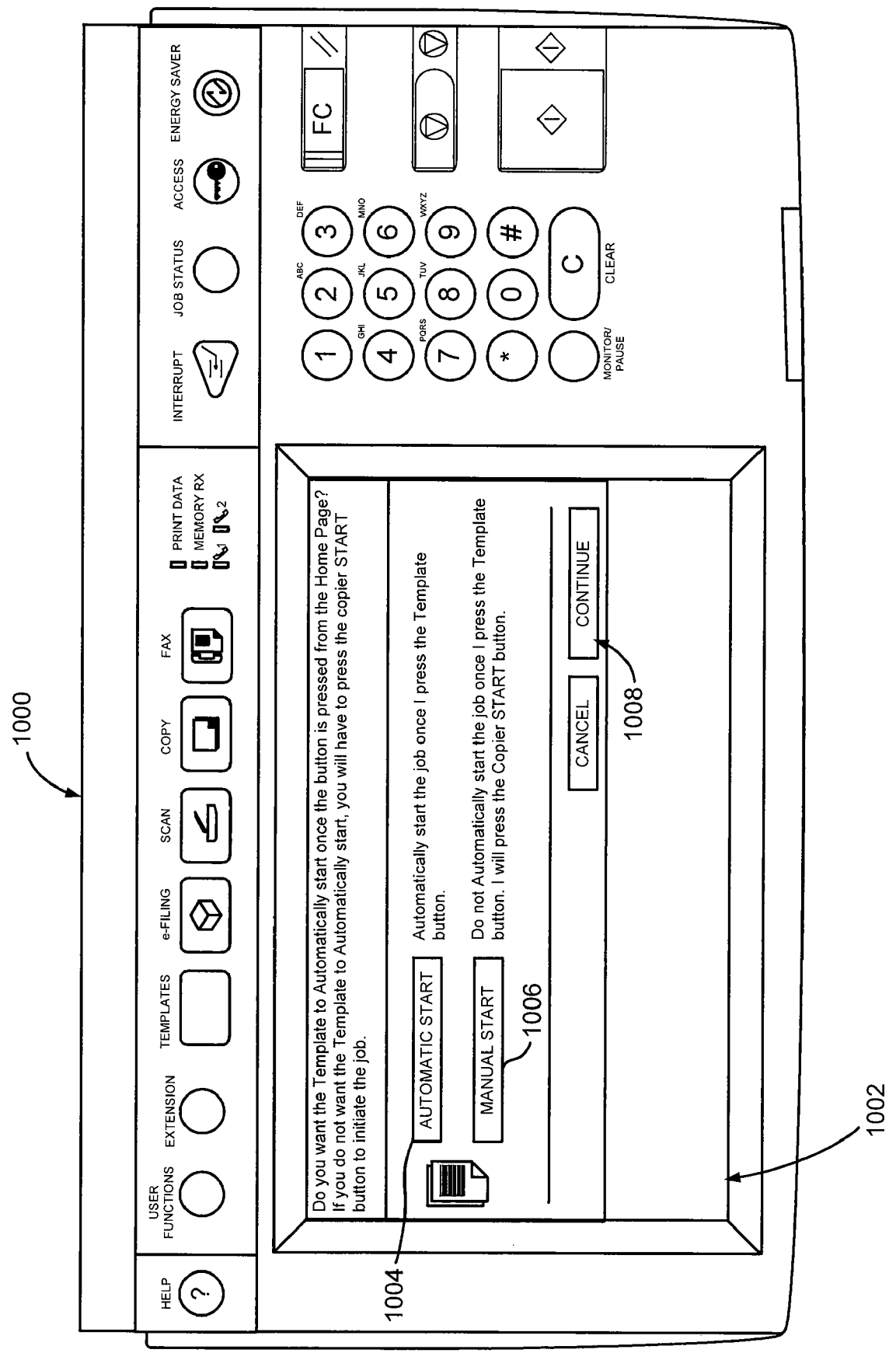
FIG. 10 also illustrates an example user interface for use in the system for on-demand generation of a selectable input for enacting a previous document processing device control sequence according to one embodiment of the subject application.
Figure 11:
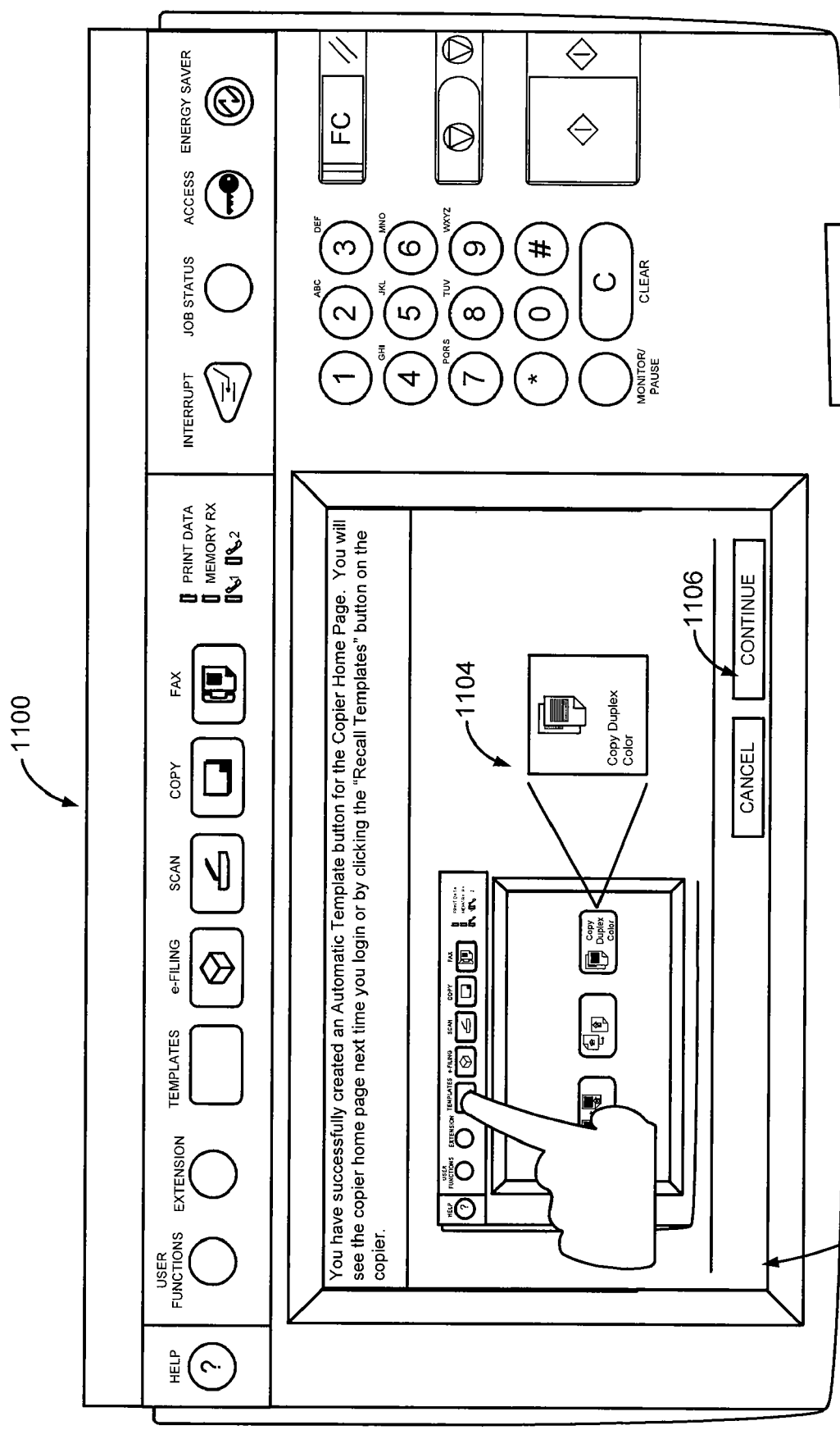
FIG. 11 is an example illustrating a user interface for use in the system for on-demand generation of a selectable input for enacting a previous document processing device control sequence according to one embodiment of the subject application.

FIG. 9 illustrates a suitable example user interface 900 corresponding to the generation of indicia thereon. As shown in FIG. 9, the user interface 900 includes a touchscreen panel 902, upon which is displayed generated selectable inputs 904 and 906 that correspond to the sequence of document processing instructions. The skilled artisan will appreciate that the icon 904 and the description 906 are capable of user modification, as is known in the art. Approval of the sequence and associated selectable indicia is then input by the user via the selection of the "continue" icon 908. Thereafter, FIG. 10 is displayed, illustrating a further example user interface 1000, depicting a touchscreen display 1002 that prompts the user to select an "automatic start" icon 1004 or a "manual start" icon 1006. The skilled artisan will appreciate that the selections of FIG. 10 are shown for example purposes only, and other user-specified instructions are capable of being received and associated with the selectable input corresponding to the sequence of document processing instructions, as are known in the art. The user then provides approval via selection of the "continue" icon 1008, which prompts the display of the user interface 1100 of FIG. 11. FIG. 11 suitably illustrates a touchscreen panel 1102 via which is displayed a summary 1104 of the manner in which the associated user is capable of initiating the sequence of document processing instructions. User approval is then received via the selection of the "continue" icon 1106 displayed via the touchscreen panel 1102.

Flow then proceeds from step 532 to step 534, whereupon a determination is made as to whether approval data has been received that is representative of user approval of the sequence and associated selectable input. When no approval is received, e.g. the user cancels the operation, flow returns to the display of the graphical user interface set forth in step 504. When approval data is received from the associated user as determined at step 534, the logged data, e.g. the sequence of document processing instructions, is associated with the selectable input, e.g. the selected icon, at step 536. Preferably, this selectable input and associated sequence of instructions are then stored in association with the user identification data, thereby becoming available to the user upon future logins with respect to the document processing device 104, other devices coupled to the computer network 102, or the like. A selectable control indicia is then generated on the graphical user interface of the user interface 106 corresponding to the selectable input associated with the selected sequence at step 538.

A determination is then made at step 540 whether the user has selected the selectable input; that is, whether the user has selected the icon associated with the sequence of document processing instructions via the graphical user interface of the user interface 106 associated with the document processing device 104. Upon selection of the selectable input by the user at step 540, flow proceeds to step 542, whereupon the document processing device 104 commences the performance of the sequence of instructions associated with the selectable input.

The subject application extends to computer programs in the form of source code, object code, code intermediate sources and partially compiled object code, or in any other form suitable for use in the implementation of the subject application. Computer programs are suitably standalone applications, software components, scripts, or plug-ins to other applications. Computer programs embedding the subject application are advantageously embodied on a carrier, being any entity or device capable of carrying the computer program: for example, a storage medium such as ROM or RAM; optical recording media such as CD-ROM; magnetic recording media such as floppy discs; any transmissible carrier such as an electrical or optical signal conveyed by electrical or optical cable; by radio; or other means. Computer programs are suitably downloaded across the Internet from a server. Computer programs are also capable of being embedded in an integrated circuit. Any and all such embodiments containing code that will cause a computer to perform substantially the subject application principles as described will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally, and equitably entitled.

What is claimed is:

1. A system for on-demand generation of a selectable input for enacting a previous document processing device control sequence comprising:

means for receiving identification data corresponding to a user of a document processing device;

means for opening a document processing session upon receipt of the identification data;

means for receiving a sequence of document processing instructions from the user during a document processing session;

logging means for automatically storing logged data associated with the sequence of document processing instructions from the user during the document processing session;

memory means for maintaining the logged data in the means for automatically storing after completion of the document processing session;

means for receiving a request to generate a selectable input corresponding to the logged data of the document processing session;

testing means for testing whether a current document processing session has been logged;

means for retrieving the logged data from the memory means when the testing means indicates that the current document processing session has not been logged;

the association means including means for associating the sequence of document processing instructions from the logged data with the selectable input; and means for commencing performance of the sequence of document processing instructions in response to a selection of the selectable input by the user.

2. The system of claim 1 further comprising:

a graphical user interface, including means for generating selectable indicia on the graphical user interface, wherein the request is generated in response to a selection of the selectable indicia; and wherein the graphical user interface further includes means for generating a selectable control indicia on the graphical user interface the selection of which commences the sequence of document processing instructions.

3. The system of claim 1 further comprising means for appending the logged data in the memory means with new logged data from the current document processing session.

4. The system of claim 2 wherein the graphical user interface further comprises means for generating indicia corresponding to the sequence of document processing instructions.

5. The system of claim 4 further comprising means for receiving approval of the sequence of document processing instructions received after generating of the indicia corresponding to the sequence of document processing instructions.

6. The system of claim 5 wherein the association means includes means for associating the logged data with the selectable input in accordance with received approval.

7. A method for on-demand generation of a selectable input for enacting a previous document processing device control sequence comprising:

receiving identification data corresponding to a user of a document processing device;

opening a document processing session upon receipt of the identification data;

receiving a sequence of document processing instructions from a user during a document processing session;

automatically storing the sequence of document processing instructions from the user during the document processing session as logged data;

maintaining the logged data in memory after completion of the document processing session;

receiving to a request to generate a selectable input corresponding to the logged data;

testing whether a current document processing session has been logged;

retrieving the logged data from the memory when the testing indicates that the current document processing session has not been logged;

associating the sequence of document processing instructions from the logged data with the selectable input; and commencing performance of the sequence of selected document processing instructions in response to a selection of the selectable input by the user.

8. The method of claim 7 further comprising:

generating selectable indicia on a graphical user interface, wherein the request is generated in response to a selection of the selectable indicia; and generating a selectable control indicia on the graphical user interface the selection of which commences the sequence of document processing instructions.

9. The method of claim 7 further comprising appending the logged data in the memory with new logged data from the current document processing session.

10. The method of claim 8 further comprising generating indicia corresponding to the sequence of document processing instructions on the graphical user interface.

11. The method of claim 10 further comprising receiving approval of the sequence of document processing instructions received after generating of the indicia corresponding to the sequence of document processing instructions.

12. The method of claim 11 wherein the logged data is associated with the selectable input in accordance with received approval.

* * * * *